(No Model.)
G. W. SCHAEFER & F. MEHNERT.
SEED DISTRIBUTING DISK.
No. 439,025. Patented Oct. 21, 1890.
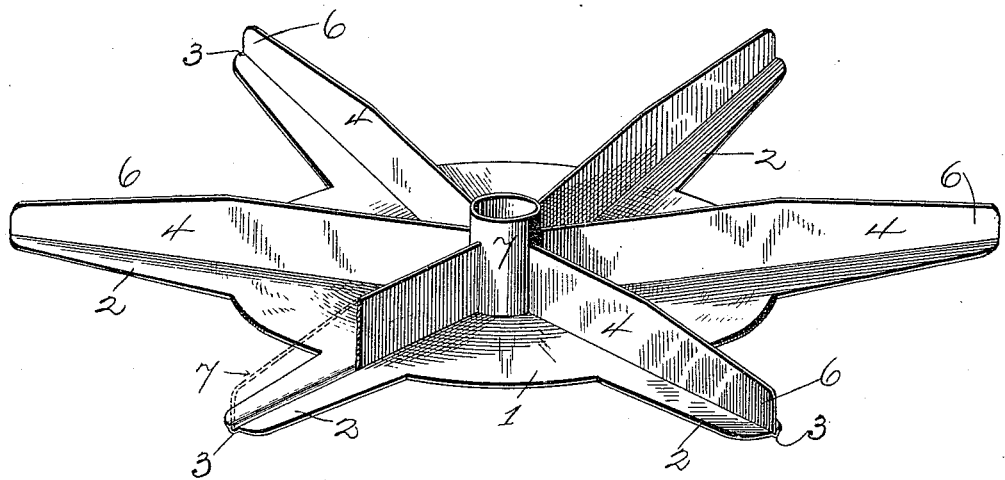
Witnesses
Inventors
George W. Schaefer
Fredrick Mehnert
By their Attorney
Chas. J. Gooch

UNITED STATES PATENT OFFICE.

GEORGE W. SCHAEFER AND FREDRICK MEHNERT, OF GOSHEN, INDIANA.

SEED-DISTRIBUTING DISK.

SPECIFICATION forming part of Letters Patent No. 439,025, dated October 21, 1890.

Application filed February 17, 1890. Serial No. 340,747. (No model.)

*To all whom it may concern:*

Be it known that we, GEORGE W. SCHAEFER and FREDRICK MEHNERT, citizens of the United States, residing at Goshen, in the county of Elkhart and State of Indiana, have invented certain new and useful Improvements in Seed-Distributing Disks; and we do hereby declare the following to be a full, clear, and exact description of the invention, such as will enable others skilled in the art to which it appertains to make and use the same.

Our invention relates to certain improvements in the construction of flutters for broadcast seed-sowers.

Our improved flutter, upon which the seed to be cast is deposited from the hopper and from which it is cast by the reciprocal or oscillatory movements of said flutter, imparted thereto in the customary manner, consists of a concaved star-shaped disk stamped between dies out of a single piece of suitable sheet metal—as iron or tin—a series of radial grooves or corrugations being formed in the process of stamping in said flutter-disks for the double purpose of affording a support for the division-wings and of strengthening the flutter-disk, a central hollow hub to receive the actuating-spindle, and a series of wings extending radially from said hub and within said grooves to the outer edge of the star-fingers, said wings having tapering outer ends to facilitate the distribution of the seed as the flutter-disk is oscillated.

The drawing represents a perspective view of our improved flutter-disk.

The disk or pan 1 is formed integrally by stamping between dies out of suitable sheet metal into concave form, with star-fingers 2 radially around its outer edge. Said disk or pan—called a "flutter-disk"—is in the process of stamping formed with a series of crimps or corrugations 3, extending in a radial direction from the center to and along the star-fingers 2, for the double purpose of strengthening and stiffening the flutter-disk and preventing its buckling in use, and also forming rests for the division-wings 4. It will be noticed that the radial corrugations 3 are of groove form in the top face of the flutter-disk. Within these grooves the wings 4, constituting divisions within which the seed to be distributed is to be received, are placed so that their lower edges shall rest therein and be thereby supported and sustained in position more securely and steadily than were such wings to rest directly upon the face of the disk, as by the support afforded said wings by such grooves there will not be the same risk of their being displaced as when resting upon the surface of the disk. Furthermore, by forming the disk of sheet metal and concaved, and also corrugating it, such disk is materially strengthened and rendered capable of extended use, is light, and can be cheaply manufactured. The wings 4 having been placed within the grooved portions of the corrugations 3, solder is run within said grooves, thereby firmly securing said wings in position. The rear ends of said wings are also soldered to the central hub. These wings are of taper form at their outer end, as shown at 6, whereby the seed discharged at each oscillation of the flutter-disk is regulated and rendered uniform in quantity and the binding of the seed prevented.

By forming the seed-guiding star-fingers 2 integrally with the body of the flutter-disk not only can the device be more easily, quickly, and cheaply constructed than where the body or pan is formed separately and the seed-guiding fingers 2 subsequently attached thereto, but their position will be more secure and they will withstand rougher usage, and they and the whole device will last longer and give better satisfaction in use than where the several parts are formed separately and subsequently connected together.

7 represents the hub, with which the mechanism, of any suitable character, for oscillating the disk is connected.

What we claim is—

1. A seed-distributing disk of concave form and having a series of star-fingers radially around its outer circumference, formed integrally with the body of the disk, and radial strengthening crimps or grooves extending from the center of the disk to the outer edge of the fingers.

2. A seed-distributing disk of concave form and having a series of star-fingers radially around its outer circumference and formed integrally with the body of the disk, a series of radial corrugations extending from the center of the disk to the outer edge of the fingers, and a series of wings or divisions seated within said corrugations and secured therein.

3. A seed-distributing disk consisting of a sheet-metal pan of concave form having a series of fingers formed integrally therewith and extending radially from the outer edge, said pan and fingers being crimped or corrugated for the double purpose of strengthening the same and of affording seats for the division-wings, a series of division-wings seated within and secured to said crimps or corrugations, and a central hub forming a rear support for the division-wings and adapted to connect with the disk-oscillating mechanism.

4. A concaved seed-distributing disk having around its circumference a series of seed-discharge fingers formed integrally therewith, a series of grooves or corrugations radiating from the center of the disk to the outer edge of the said fingers, and a series of division-wings resting and secured within said grooves and having tapering outer ends to facilitate the uniform distribution of the seed.

In testimony whereof we affix our signatures in presence of two witnesses.

GEORGE W. SCHAEFER.
FREDRICK MEHNERT.

Witnesses:
W. A. WHIPPY,
E. G. RITCHIE.